United States Patent Office.

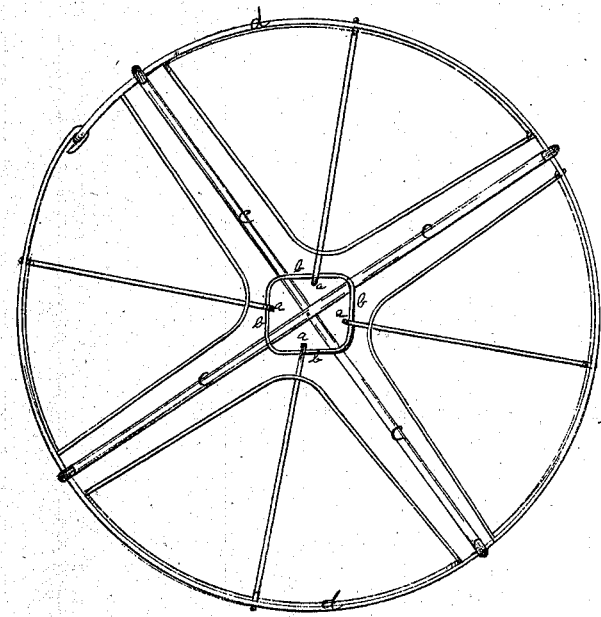
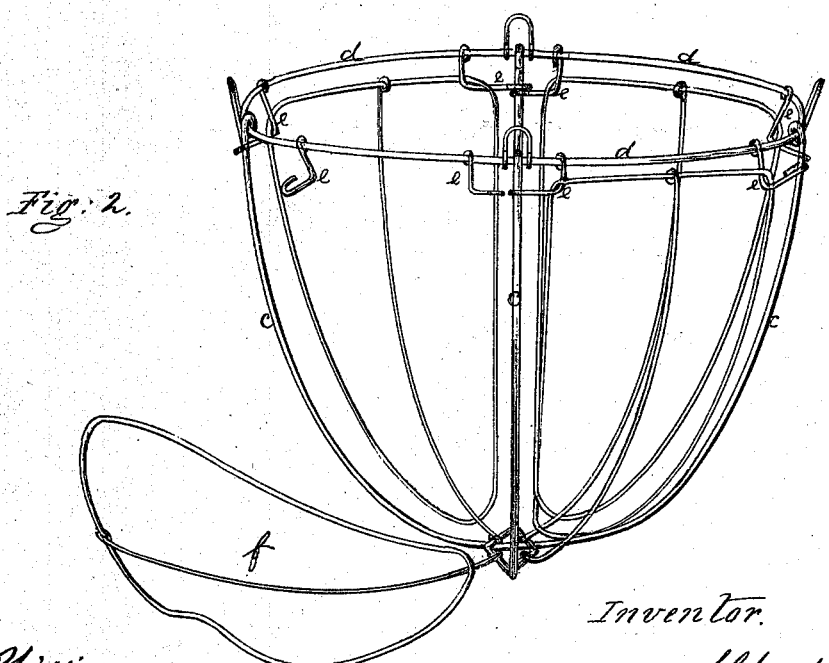

ALBERT P. EASTMAN, OF WASHINGTON, DISTRICT OF COLUMBIA.

Letters Patent No. 112,433, dated March 7, 1871.

IMPROVEMENT IN BASKETS FOR HOUSE-PLANTS.

The Schedule referred to in these Letters Patent and making part of the same.

I, ALBERT P. EASTMAN, of Washington, county of Washington and District of Columbia, have invented an Improvement in Baskets for House-Plants, which baskets are lined with moss before receiving the earth and plants. The following is a specification:

Figure 1 is a plan view, showing inside and bottom of basket.

Figure 2 is a view of the basket in an upright position, with one section unhooked and open.

This invention consists of a basket (of wire or other suitable material) for house-plants, and is made to open in sections or parts, the object of such construction being to allow the opening of one section at a time, in order to remove the old moss and substitute fresh moss, whenever desirable, without disturbing the plants in the basket.

In a short time after moss has been placed in a basket it withers and becomes unsightly, but, as baskets are made, it cannot be changed without first removing the plants.

Referring to the drawing—

$c$ and $d$ is a rigid frame, $d$ being the top and $c$ the sides and bottom. To this frame are secured the movable sections, the wires by which the basket is hung up, or whatever it rests upon.

The frame gives strength and firmness to the basket, and, by allowing the sections to open independent of each other, prevents the plants and earth in the basket being disturbed.

$a$ are hooks or hinges by which the sections are secured at the bottom; each section may have one or more of these.

$b$ is a wire, fastened to frame $c$, and to it, $b$, the sections are hinged.

$e$ are hooks, by which the upper part of each section, when closed, is secured to the frame $c$ and $d$. Springs or other convenient means may be used for the same purpose.

$f$ represents a section open; the others are represented closed.

The above explains the construction of the basket.

The drawing is as simple as possible, merely showing the principle involved, without exhibiting any ornamental work, or any legs or other contrivances for the basket to rest on.

The sections can be made to open from the bottom or from the side, as well as from the top.

The part of frame $c$ might be dispensed with, and the lower part of each section made to hook into the opposite section, or into a ring or square of wire like $b$, that is, when the sections are hinged at the top to the frame $d$.

The sections could be secured at the bottom when hinged at the top, by being hooked into a plate of sheet-iron or other material, which plate would have holes for this purpose.

The hooks could be in the shape of loops, and be keyed by inserting wire or other keys through the loops, after the loops have been hooked through the plate.

I claim as my invention—

The basket for house-plants herein described, consisting of the rigid frame $c\ d$, and the movable sections $f$, substantially as and for the purpose specified.

ALBERT P. EASTMAN.

Witnesses:
S. N. EASTMAN,
JOS. T. K. PLANT.